US008813169B2

(12) United States Patent
Shieh et al.

(10) Patent No.: US 8,813,169 B2
(45) Date of Patent: Aug. 19, 2014

(54) VIRTUAL SECURITY BOUNDARY FOR PHYSICAL OR VIRTUAL NETWORK DEVICES

(75) Inventors: Choung-Yaw Michael Shieh, Palo Alto, CA (US); Jia-Jyi Roger Lian, Saratoga, CA (US)

(73) Assignee: Varmour Networks, Inc., Santa Clara, CA (US)

( * ) Notice: Subject to any disclaimer, the term of this patent is extended or adjusted under 35 U.S.C. 154(b) by 0 days.

(21) Appl. No.: 13/288,872

(22) Filed: Nov. 3, 2011

(65) Prior Publication Data

US 2013/0117801 A1    May 9, 2013

(51) Int. Cl.
*G06F 17/00* (2006.01)
*H04L 29/06* (2006.01)

(52) U.S. Cl.
CPC .......... *H04L 63/0209* (2013.01); *H04L 63/104* (2013.01); *H04L 63/0272* (2013.01)
USPC ............................................................ 726/1

(58) Field of Classification Search
CPC .............. H04L 63/0209; H04L 63/014; H04L 63/0272
USPC ............................................................ 726/1
See application file for complete search history.

(56) References Cited

U.S. PATENT DOCUMENTS

| 6,992,985 | B1 | 1/2006 | Das |
| 7,062,566 | B2 | 6/2006 | Amara et al. |
| 7,774,837 | B2 | 8/2010 | McAlister et al. |
| 7,849,495 | B1 | 12/2010 | Huang et al. |
| 8,274,912 | B2 | 9/2012 | Wray et al. |
| 8,321,862 | B2 * | 11/2012 | Swamy et al. ................... 718/1 |
| 2003/0177389 | A1 | 9/2003 | Albert et al. |
| 2004/0095897 | A1 | 5/2004 | Vafaei |
| 2007/0079308 | A1 | 4/2007 | Chiaramonte et al. |
| 2008/0083011 | A1 | 4/2008 | McAlister et al. |
| 2008/0155239 | A1 | 6/2008 | Chowdhury et al. |
| 2008/0301770 | A1 * | 12/2008 | Kinder ............................. 726/2 |
| 2010/0043068 | A1 | 2/2010 | Varadhan et al. |
| 2010/0235880 | A1 | 9/2010 | Chen et al. |
| 2011/0003580 | A1 | 1/2011 | Belrose et al. |

(Continued)

FOREIGN PATENT DOCUMENTS

WO    WO 2011/012165    2/2011

OTHER PUBLICATIONS

U.S. Appl. No. 13/363,088, Office Action, Dated Feb. 13, 2013, 6 pages.

(Continued)

*Primary Examiner* — Peter Shaw
(74) *Attorney, Agent, or Firm* — Blakely, Sokoloff, Taylor & Zafman LLP

(57) ABSTRACT

A method and apparatus is disclosed herein for using a virtual security boundary. In one embodiment, the method comprises receiving information from a virtual machine after the virtual machine has been moved from a first physical location in a network to a second physical location in the network, where the information identifies the virtual machine as one previously assigned to a security boundary; determining that access to the virtual machine at the first physical location was permitted by the security gateway; assigning the virtual machine at the second physical location to the security boundary, and applying a security policy associated with the security boundary to communications between the network and the virtual machine at the second physical location.

18 Claims, 5 Drawing Sheets

(56) References Cited

U.S. PATENT DOCUMENTS

| | | |
|---|---|---|
| 2011/0069710 A1 | 3/2011 | Naven et al. |
| 2011/0225624 A1* | 9/2011 | Sawhney et al. .................. 726/1 |
| 2011/0263238 A1 | 10/2011 | Riley et al. |
| 2012/0017258 A1 | 1/2012 | Suzuki |
| 2012/0131685 A1 | 5/2012 | Broch et al. |
| 2012/0311575 A1* | 12/2012 | Song ................................ 718/1 |
| 2013/0097692 A1 | 4/2013 | Cooper et al. |

OTHER PUBLICATIONS

U.S. Appl. No. 13/363,088, Notice of Allowance and Fee(s) Due, Dated Aug. 16, 2013, 12 pages.
U.S. Appl. No. 13/285,814, Office Action, Dec. 11, 2012, 21 pages.
U.S. Appl. No. 13/285,814, Office Action, Aug. 20, 2013, 23 pages.

* cited by examiner

VIRTUAL SECURITY BOUNDARY FOR PHYSICAL OR VIRTUAL NETWORK DEVICES

FIELD OF THE INVENTION

Embodiments of the present invention relate to the field of network security; more particularly, embodiments of the present invention relate to using a security boundary for physical or virtual network devices when such devices move to different locations.

BACKGROUND OF THE INVENTION

A security boundary, sometimes referred to as a security zone, is defined so that network devices share the same security policies within the same security boundary. The network devices cannot communicate with the network devices in different security boundary without explicit permission. Conventional network security devices are designed to protect a static, fixed security boundary, primary using interface or IP address to define the security boundary. In a data center where virtual machines are deployed, network administrators could add or move the virtual machines to any physical servers, which may connect to the security gateways from different interfaces with different IP addresses and subnets. Thus, conventional security devices cannot create effective security boundary for the virtual machines since interface or IP address is not enough to classify virtual machines to different security boundaries.

As many companies deploy virtual machines in their IT environment, the fixed security boundary cannot support the dynamic nature of virtual machines. Many virtual machines may acquire IP address from DHCP server, and the virtual machines may be moved from one host to another host with different IP address at run time. In such a case, the security gateway interfacing the virtual machines to the network would not recognize the virtual machine because the virtual machine was attempting to use a different IP address for communication.

SUMMARY OF THE INVENTION

A method and apparatus is disclosed herein for using a virtual security boundary. In one embodiment, the method comprises receiving information from a virtual machine after the virtual machine has been moved from a first physical location in a network to a second physical location in the network, where the information identifies the virtual machine as one previously assigned to a security boundary; determining that access to the virtual machine at the first physical location was permitted by the security gateway; assigning the virtual machine at the second physical location to the security boundary, and applying a security policy associated with the security boundary to communications between the network and the virtual machine at the second physical location.

BRIEF DESCRIPTION OF THE DRAWINGS

The present invention will be understood more fully from the detailed description given below and from the accompanying drawings of various embodiments of the invention, which, however, should not be taken to limit the invention to the specific embodiments, but are for explanation and understanding only.

DETAILED DESCRIPTION OF THE PRESENT INVENTION

Figure 1:
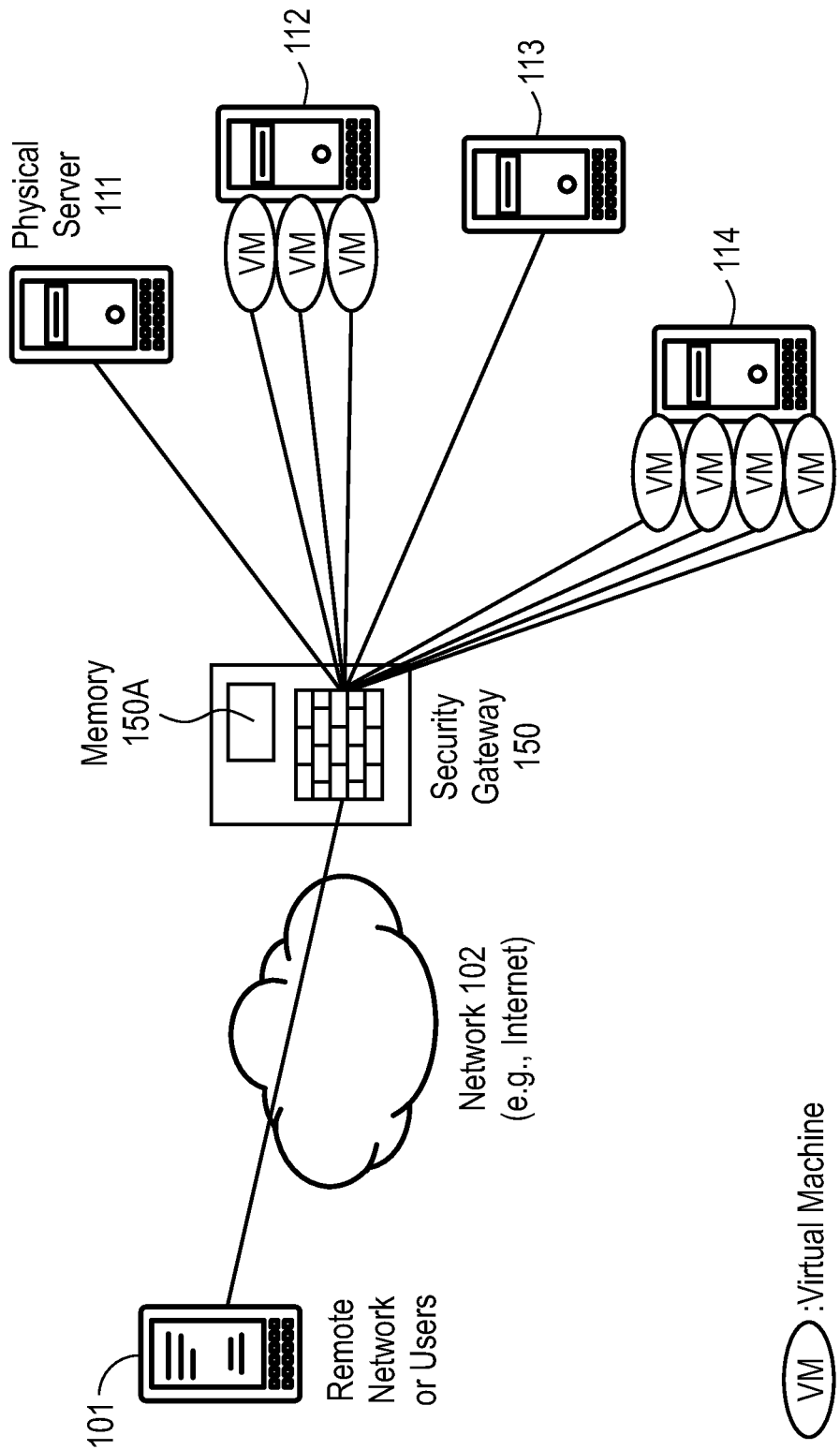
FIG. 1 is a block diagram of one embodiment of a network that includes virtual machines and physical servers.

Embodiments of the present invention create virtual security boundaries for network devices. Using the techniques described herein, any network devices, whether they are virtual machines or physical servers, regardless of their IP address and physical location, can be assigned to the same security boundary and protected by the same security policies. In other words, a security policy can be assigned to a security boundary and all network devices assigned to that security boundary are protected by the security policy.

Advantages of embodiments of the present invention include, without limitation, that the protected network devices are portable independently from the network layer. Even if a virtual machine is moved to another host, or physical location with a different IP address, as long as the agent registers with the same identity, the virtual machine will be in the same security boundary. The security boundary may include both physical and virtual devices, on premises and/or in the cloud.

In this way, embodiments of the present invention virtualize the security layer to support emerging virtualization in the IT industry. While the IT industry is moving toward server virtualization to save cost, the design of network security remains the same without supporting the key characteristics of virtualization. Embodiments of the present invention are able to create a virtual security layer in the virtualization environment, which provides network security for virtual machines.

In the following description, numerous details are set forth to provide a more thorough explanation of the present invention. It will be apparent, however, to one skilled in the art, that the present invention may be practiced without these specific details. In other instances, well-known structures and devices are shown in block diagram form, rather than in detail, in order to avoid obscuring the present invention.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

A machine-readable medium includes any mechanism for storing or transmitting information in a form readable by a machine (e.g., a computer). For example, a machine-readable medium includes read only memory ("ROM"); random access memory ("RAM"); magnetic disk storage media; optical storage media; flash memory devices; etc.

An Example of a Network

FIG. 1 is a block diagram depicting a network architecture 100 in which client system 101, as well as host computers (e.g., servers) 111 and 112 (any of which can be implemented using a computer system), are coupled to a network 103. Hosts 111-114 are coupled to network 103 via security gateway 150. Note that network 100 may include more than one client device and more or less than four hosts. Also the network 100 may include more than one security gateway.

In one embodiment, client 101, security gateway 150, and hosts 111-114 are implemented with a computer system include a modem, network interface or some other method can be used to provide connectivity to network 103. Client system 101 is able to access information on hosts 111-114 using, for example, a web browser or other client software (not shown). Such a client allows client system 101 to access data hosted by hosts 111-114 or one of storage devices in the network. While FIG. 1 depicts the use of a network such as the Internet for exchanging data between a client, the security gateway and servers, the techniques described herein are not limited to the use of the Internet or any particular network-based environment.

Hosts 111-114 are physical machines and each may include one or more virtual machines (VMs). In one embodiment, these virtual machines are created dynamically in a manner well-known in the art. Each of the virtual machines acquires an IP address dynamically from DHCP servers in network 100 during boot up in a manner well-known in the art. In one embodiment, the virtual machines may share the same physical host with other virtual machines yet belong to different security boundaries. The virtual machines may be moved to different physical hosts to accommodate various computing requirements.

Security gateway 150 includes memory 150A that includes information (e.g., a set of security policies) and code to perform access control using security policies, as well as communicate with virtual machines and perform operations associated with those situations when the virtual machines are moved to different physical hosts as described herein.

Figure 2:
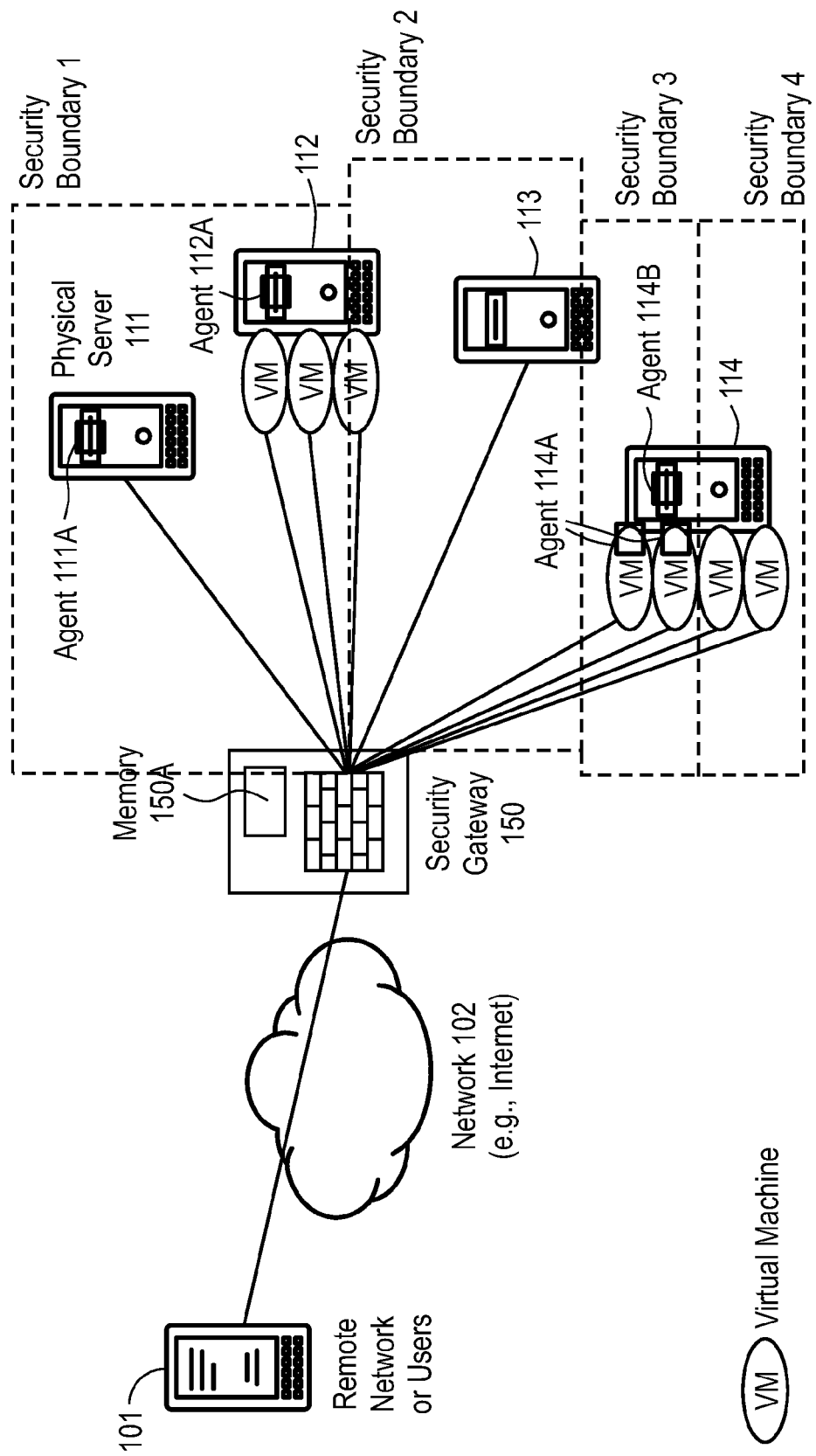
FIG. 2 illustrates security boundaries that include virtual machines on different physical hosts (e.g., servers) of FIG. 1.

FIG. 2 is a block diagram of one embodiment of a network in which there is security boundaries are created for both physical and virtual network devices. In one embodiment, a software agent installed in each physical and virtual network devices communicates with security gateway 150 to provide network security according to an integrated security policy. Examples of these are shown as agent 111A in host 111, agent 112A in host 112, agent 114A in a virtual machine in host 114, and agent 114B in host 114. Note that other virtual machines and hosts in the network may include such agents although they haven't been shown to avoid obscuring the present invention.

In one embodiment, the software agent of the virtual device forwards information to security gateway 150 as part of its communication with security gateway 150. In one embodiment, this information includes the identity and information of the network device, such as, for example, the IP address, its identity, current login user, and security patch level. This information is sent after the virtual network device boots up. Security gateway 150 uses the information, combined with the configuration, to create an integrated security policy to form the virtual security boundary for security gateway 150 and the network devices.

In another embodiment, software gateway 150 could use an information repository to query the information without running software agent on each virtual device. For example, this could be done for those virtual devices running are managed by VMware management consoles. Software gateway 150 could use the published API of the management console to access the individual virtual devices.

Once security gateway 150 has the information of each virtual device, it integrates the information with the security policy, and applies the corresponding security policy for traffic to each of the virtual devices. The application of the security policy is independent of what the IP addresses or the location of the virtual devices.

In one embodiment, the agent is in the guess OS of the virtual machines. In another embodiment, the agent is in the kernel of virtual machines. In yet another embodiment, the agent is in a separate module calling the Application Programming Interface (API) provided by the vendor of the virtual machines. In all these cases, the security gateway uses the information passed from the agent to identify the virtual machines to create the security boundary.

In one embodiment, the agent runs on each of the virtual machines of a host. In another embodiment, the agent runs on a physical server. The virtual machines, the host, or the physical server may be in the premises of the company's IT department, or it could be located off-campus, at Internet, or in the cloud managed by other companies. As long as there are connectivity between security gateway 150 and the logical network devices, security gateway 150 can collect the information passed from the agent to establish the security boundary.

In one embodiment, security gateway 150 sets up the security boundary for the virtual machines by blocking access from other security boundary, except where it's configuration allows such access. If confidentiality is required, in one embodiment, security gateway 150 encrypts all traffic within the security boundary. This would provide stronger security by preventing one from other security boundary sniffing or analyze the network traffic.

Figure 3:
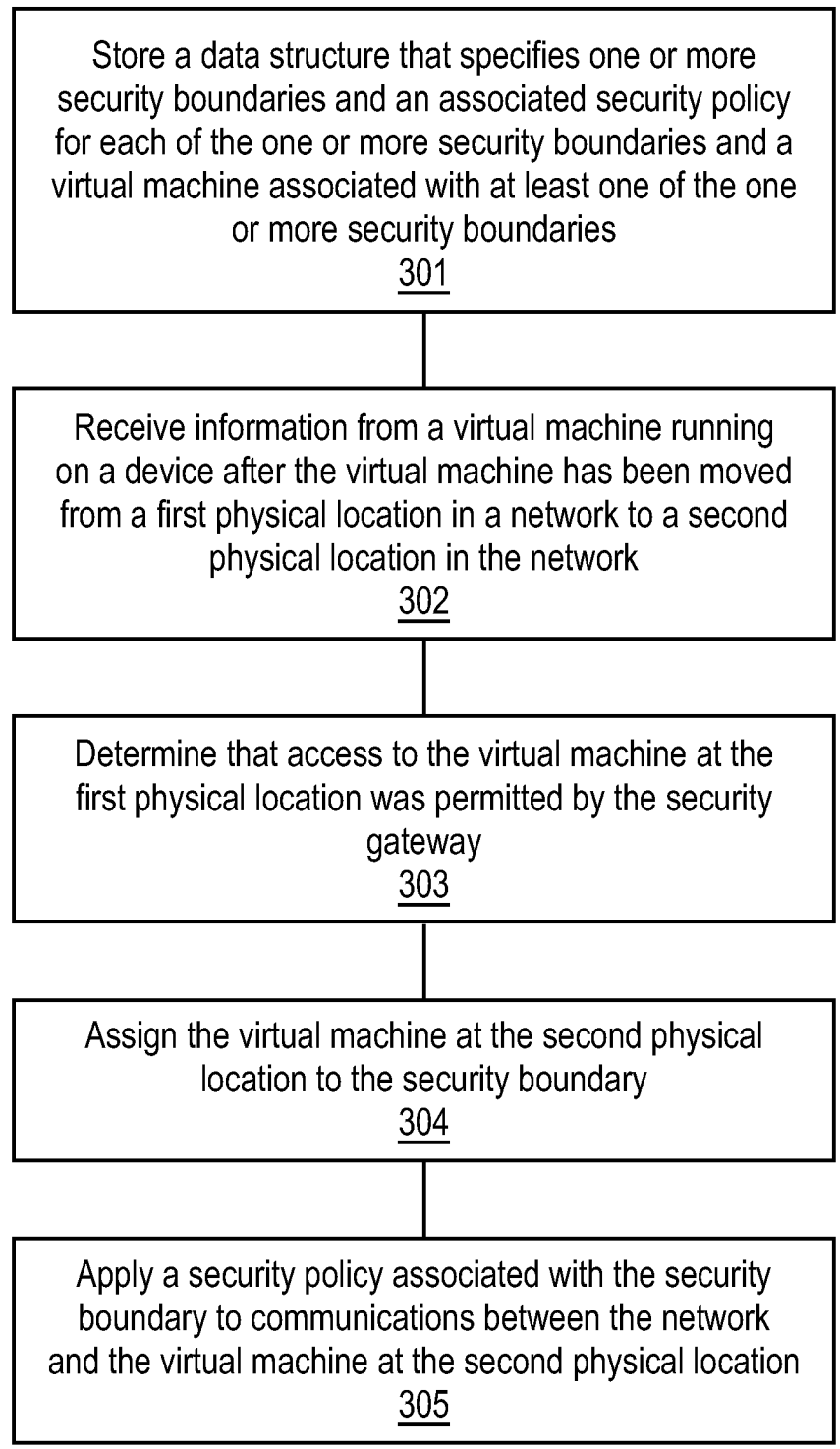
FIG. 3 is a dataflow diagram of one embodiment of a process for ascertaining and applying security access control.

FIG. 3 is a dataflow diagram of one embodiment of a process for ascertaining and applying security access control. The process is performed by processing logic that may comprise hardware (circuitry, dedicated logic, etc.), software (such as is run on a general purpose computer system or a dedicated machine), or a combination of both. In one embodiment, the process is performed by a security gateway in a network.

Referring to FIG. 3, the process begins by processing logic storing a data structure that specifies one or more security boundaries and an associated security policy for each of the one or more security boundaries and a virtual machine associated with at least one of the one or more security boundaries (processing block 301). In one embodiment, the data structure comprises a table.

Next, processing logic receives information from a virtual machine running on a device after the virtual machine has been moved from a first physical location in a network to a second physical location in the network (processing block 302). The information identifies the virtual machine as one previously assigned to a security boundary. In one embodiment, the information comprises an IP address. In one embodiment, the information comprises a security patch level. In one embodiment, the second physical location has a different Internet Protocol (IP) address than the first physical location.

Using this information, processing logic determines that access to the virtual machine at the first physical location was permitted by the security gateway (processing block 303), assigns the virtual machine at the second physical location to the security boundary (processing block 304), and applies a security policy associated with the security boundary to communications between the network and the virtual machine at the second physical location (processing block 305).

Table 1 illustrates a policy table that illustrates an example.

TABLE 1

| From SRC-IP | SRC-PORT | To DST-IP | DST-PORT | Protocol | Action |
|---|---|---|---|---|---|
| VM-A | Any | Web-server | 80 | TCP | Block |

In the case of the policy table above, regardless of where VM-A is moved in the network, the same policy still applies to VM-A, regardless of its IP address or how it connects to the security gateway.

One Embodiment of a Security Gateway

In one embodiment, the security gateway comprises a memory, a network interface, a second interface and a processor. The network interface receives network traffic from the one or more virtual machines. The processor receives information (e.g., packets) from a virtual machine after the virtual machine has been moved from a first physical location in a network to a second physical location in the network. The information identifies the virtual machine as one previously assigned to a security boundary. In one embodiment, the information is sent by an agent on the network device that is running the virtual machine. The agent may be a software agent running on the virtual machine itself. Using this information, the processor determines that access to the virtual machine at the first physical location was permitted by the security gateway, assigns the virtual machine at the second physical location to the security boundary, and applies a security policy associated with the security boundary to communication between the network and the virtual machine at the second physical location.

Figure 4:
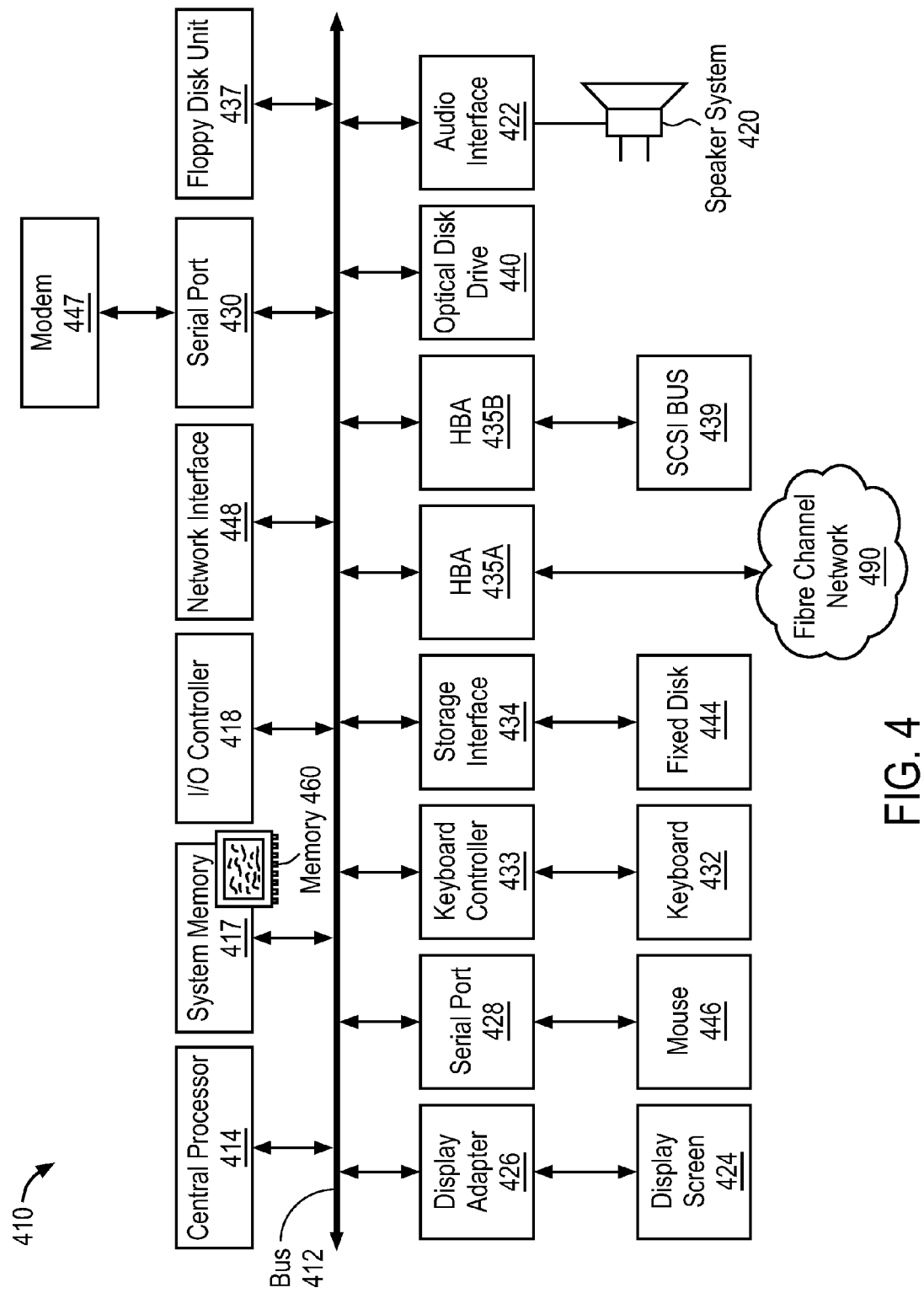
FIG. 4 depicts a block diagram of a security gateway, such as security gateway 150 of FIG. 1.

FIG. 4 depicts a block diagram of a security gateway, such as security gateway 150 of FIG. 1. Referring to FIG. 4, security gateway 410 includes a bus 412 to interconnect subsystems of security gateway 410, such as a processor 414, a system memory 417 (e.g., RAM, ROM, etc.), an input/output controller 418, an external device, such as a display screen 424 via display adapter 426, serial ports 428 and 430, a keyboard 432 (interfaced with a keyboard controller 433), a storage interface 434, a floppy disk drive 437 operative to receive a floppy disk 438, a host bus adapter (HBA) interface card 435A operative to connect with a Fibre Channel network 490, a host bus adapter (HBA) interface card 435B operative to connect to a SCSI bus 439, and an optical disk drive 440. Also included are a mouse 446 (or other point-and-click device, coupled to bus 412 via serial port 428), a modem 447 (coupled to bus 412 via serial port 430), and a network interface 448 (coupled directly to bus 412).

Bus 412 allows data communication between central processor 414 and system memory 417. System memory 417 (e.g., RAM) may be generally the main memory into which the operating system and application programs are loaded. The ROM or flash memory can contain, among other code, the Basic Input-Output system (BIOS) which controls basic hardware operation such as the interaction with peripheral components. Applications resident with computer system 410 are generally stored on and accessed via a computer readable medium, such as a hard disk drive (e.g., fixed disk 444), an optical drive (e.g., optical drive 440), a floppy disk unit 437, or other storage medium.

Storage interface 434, as with the other storage interfaces of computer system 410, can connect to a standard computer readable medium for storage and/or retrieval of information, such as a fixed disk drive 444. Fixed disk drive 444 may be a part of computer system 410 or may be separate and accessed through other interface systems.

Modem 447 may provide a direct connection to a remote server via a telephone link or to the Internet via an internet service provider (ISP) (e.g., servers 101, 111-114 of FIG. 1). Network interface 448 may provide a direct connection to a remote server such as, for example, servers 111-114 of FIG. 1. Network interface 448 may provide a direct connection to a remote server (e.g., server 101 of FIG. 1) via a direct network link to the Internet via a POP (point of presence). Network interface 448 may provide such connection using wireless techniques, including digital cellular telephone connection, a packet connection, digital satellite data connection or the like.

Many other devices or subsystems (not shown) may be connected in a similar manner (e.g., document scanners, digital cameras and so on). Conversely, all of the devices shown in FIG. 4 need not be present to practice the techniques described herein. The devices and subsystems can be interconnected in different ways from that shown in FIG. 4. The operation of a computer system such as that shown in FIG. 4 is readily known in the art and is not discussed in detail in this application.

Code to implement the security gateway operations described herein can be stored in computer-readable storage media such as one or more of system memory 417, fixed disk 444, optical disk 442, or floppy disk 438. The operating system provided on computer system 410 may be MS-DOS®, MS-WINDOWS®, OS/2®, UNIX®, Linux®, or another known operating system.

Figure 5:
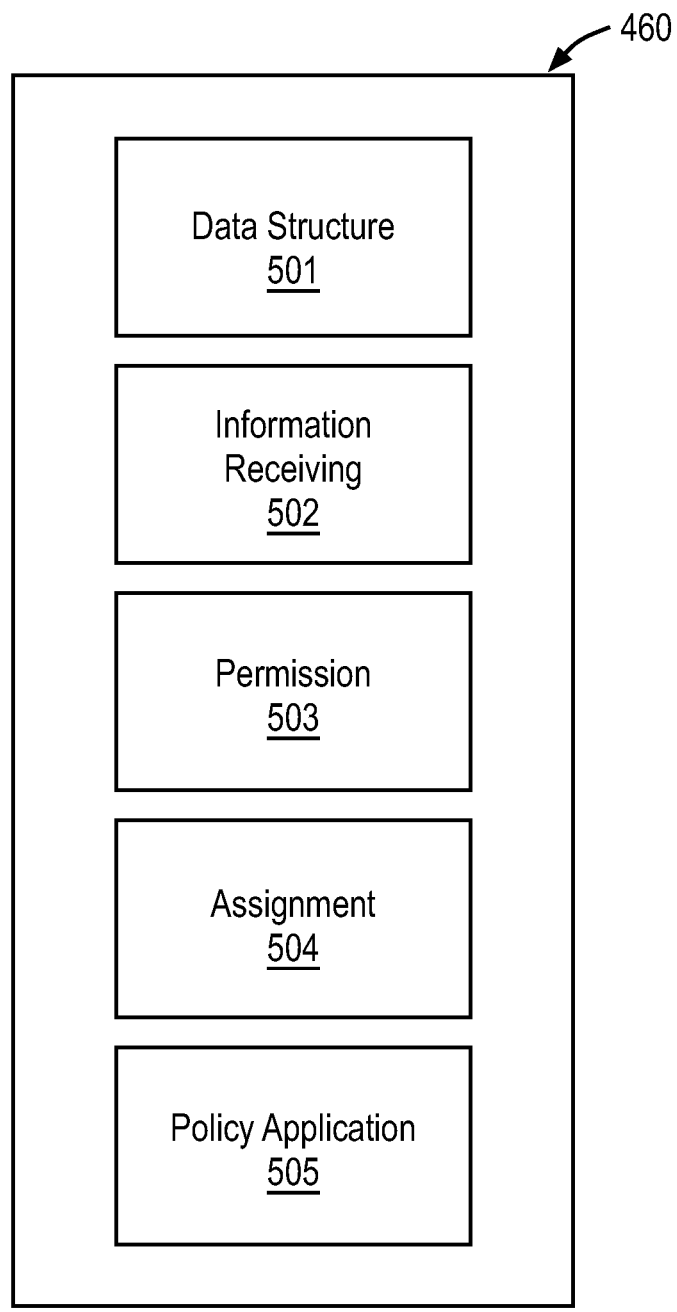
FIG. 5 illustrates a set of code (e.g., programs) and data that is stored in memory of one embodiment of a security gateway, such as the security gateway set forth in FIG. 4.

FIG. 5 illustrates a set of code (e.g., programs) and data that is stored in memory of one embodiment of a security gateway, such as the security gateway set forth in FIG. 4. The security gateway uses the code, in conjunction with a processor, to perform the necessary operations described herein.

Memory 460 stores a data structure 501 (e.g., a table) that specifies one or more security boundaries and an associated security policy for each of the one or more security boundaries and a virtual machine associated with at least one of the one or more security boundaries. Memory 460 also stores information receiving module 502, which when executed by a processor, causes the processor to receive information from a virtual machine running on a device after the virtual machine has been moved from a first physical location in a network to a second physical location in the network. Memory 460 also stores permission module 503, which, when executed by a processor, causes the processor to use the information received from the virtual machine to determine that access to the virtual machine at the first physical location was permitted by the security gateway.

Memory 460 also stores assignment module 504, which when executed by a processor, causes the processor to assign the virtual machine at the second physical location to the security boundary. Memory 460 also stores policy application module 505, which when executed by a processor, causes the processor to apply a security policy associated with the security boundary to communications between the network and the virtual machine at the second physical location.

As described above, the servers in FIG. 1, such as servers 111-114 or server 101, may be implemented using a computer system. In one embodiment, one or more of the servers 111-114 is implemented using a system such as depicted in FIG. 4 as well, except using different code to implement the techniques and operations performed by such servers and their VMs. The code is stored in computer-readable storage medium such as system memory 417, fixed disk 444, optical disk 442 or floppy disk 448. This code includes code to implement an agent (e.g., a software agent) as described above and code to send identification information to the security gateway.

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims which in themselves recite only those features regarded as essential to the invention.

We claim:

1. A method for use by a security gateway in a network topology in which the security gateway interfaces one or more virtual machines running on one or more network devices to a network, the method comprising:

receiving, by the security gateway, information from a first virtual machine after the first virtual machine has been moved from a first physical location in a network to a second physical location in the network, the information identifying the first virtual machine as one previously assigned to a virtual security boundary, wherein the virtual security boundary comprises a security policy that defines permissible communications exchanged between the first virtual machine and network devices via the security gateway, and the security gateway enforces the security policy on network communication between the network devices and the first virtual machine to create the virtual security boundary regardless of a physical location where the first virtual machine is hosted, wherein the security gateway establishes the virtual security boundary according to the security policy for a first set of one or more virtual machines to block the first set of one or more virtual machines from accessing a second virtual security boundary, except when a configuration of the security policy allows the first set of one or more virtual machines to access to the second virtual security boundary;

determining, by the security gateway, that access to the first virtual machine at the first physical location was permitted by the security gateway;

assigning the first virtual machine at the second physical location to the virtual security boundary; and applying, by the security gateway, the security policy associated with the virtual security boundary to network communication exchanged between the network devices and the first virtual machine at the second physical location via the security gateway to limit communications between the first virtual machine and the network devices over the network to the permissible communications defined in the security policy, wherein a second virtual machine at the first location is identified in the security policy, and the security policy is applied by the security gateway to network communications exchanged between the network devices and the second virtual machine via the security gateway to enforce the same virtual security boundary to electronic communications exchanged by different virtual machines at different physical locations.

2. The method defined in claim 1 wherein the second physical location has a different Internet Protocol (IP) address than the first physical location.

3. The method defined in claim 1 wherein the information comprises an IP address.

4. The method defined in claim 1 wherein the information comprises a security patch level.

5. The method defined in claim 1 further comprising storing a data structure that specifies one or more virtual security boundaries, including the virtual security boundary, at least one security policy associated with each of the one or more virtual security boundaries, and at least one virtual machine associated with at least one of the one or more virtual security boundaries.

6. The method defined in claim 5 wherein the data structure comprises a table.

7. A security gateway for using a network, the security gateway to be located between the network and one or more systems, at least one of the one or more systems having one or more virtual machines running thereon, the security gateway comprising:

a memory;

a network interface to receive network traffic; and a processor operable to receive information from a first virtual machine after the first virtual machine has been moved from a first physical location in a network to a second physical location in the network, the information identifying the first virtual machine as one previously assigned to a virtual security boundary, wherein the virtual security boundary comprises a security policy that defines permissible communications exchanged between the first virtual machine and network devices via the security gateway, and the security gateway enforces the security policy on network communication between the network devices and the first virtual machine to create the virtual security boundary regardless of a physical location where the first virtual machine is hosted, wherein the security gateway establishes the virtual security boundary according to the security policy for a first set of one or more virtual machines to block the first set of one or more virtual machines from accessing a second virtual security boundary, except when a configuration of the security policy allows the first set of one or more virtual machines to access to the second virtual security boundary, determine that access to the first virtual machine at the first physical location was permitted by the security gateway, assign the first virtual machine at the second physical location to the virtual security boundary, and apply the security policy associated with the virtual security boundary to network communication exchanged between the network devices and the first virtual machine at the second physical location via the security gateway to limit communications between the first virtual machine and the network devices over the network to the permissible communications defined in the security policy, wherein a second virtual machine at the first location is identified in the security policy, and the security policy is applied by the security gateway to network communications exchanged between the network devices and the second virtual machine via the security gateway to enforce the same virtual security boundary to electronic communications exchanged by different virtual machines at different physical locations.

8. The security gateway defined in claim 7 wherein the second physical location has a different Internet Protocol (IP) address than the first physical location.

9. The security gateway defined in claim 7 wherein the information comprises an IP address.

10. The security gateway defined in claim 7 wherein the information comprises a security patch level.

11. The security gateway defined in claim 7 wherein the memory stores a data structure that specifies one or more virtual security boundaries, including the virtual security boundary, at least one security policy associated with each of the one or more virtual security boundaries, and at least one virtual machine associated with at least one of the one or more virtual security boundaries.

12. The security gateway defined in claim 5 wherein the data structure comprises a table.

13. An article of manufacture having one or more non-transitory computer readable media storing instructions thereon which, when executed by a device in a network that is located between the network and one or more systems which have at least one or more virtual machines running thereon, causes the device to perform a method comprising:

receiving, by the device, information from a first virtual machine after the first virtual machine has been moved from a first physical location in a network to a second physical location in the network, the information identifying the first virtual machine as one previously assigned to a virtual security boundary, wherein the virtual security boundary comprises a security policy that defines permissible communications exchanged between the first virtual machine and network devices via the security gateway, and the security gateway enforces the security policy on network communication between the network devices and the first virtual machine to create the virtual security boundary regardless of a physical location where the first virtual machine is hosted, wherein the security gateway establishes the virtual security boundary according to the security policy for a first set of one or more virtual machines to block the first set of one or more virtual machines from accessing a second virtual security boundary, except when a configuration of the security policy allows the first set of one or more virtual machines to access to the second virtual security boundary;

determining, by the device, that access to the first virtual machine at the first physical location was permitted by the device;

assigning the first virtual machine at the second physical location to the virtual security boundary; and applying, by the device, the security policy associated with the virtual security boundary to network communication exchanged between the network devices and the first virtual machine at the second physical location via the security gateway to limit communications between the first virtual machine and the network devices over the network to the permissible communications defined in the security policy, wherein a second virtual machine at the first location is identified in the security policy, and the security policy is applied by the security gateway to network communications exchanged between the network devices and the second virtual machine via the security gateway to enforce the same virtual security boundary to electronic communications exchanged by different virtual machines at different physical locations.

14. The article of manufacture defined in claim 13 wherein the second physical location has a different Internet Protocol (IP) address than the first physical location.

15. The article of manufacture defined in claim 13 wherein the information comprises an IP address.

16. The article of manufacture defined in claim 13 wherein the information comprises a security patch level.

17. The article of manufacture defined in claim 13 wherein the method further comprises maintaining a data structure that specifies one or more virtual security boundaries, including the virtual security boundary, at least one security policy associated with each of the one or more virtual security boundaries, and at least one virtual machine associated with at least one of the one or more virtual security boundaries.

18. The article of manufacture defined in claim 17 wherein the data structure comprises a table.

* * * * *